United States Patent [19]

Gutekunst et al.

[11] Patent Number: 4,648,325
[45] Date of Patent: Mar. 10, 1987

[54] LINEAR DRIVE UNIT

[75] Inventors: Stanley K. Gutekunst, Nazareth; Russell H. Scheel, Easton; Barry L. Ziegenfus, Saylorsburg, all of Pa.

[73] Assignee: Heico Inc., Mendota, Ill.

[21] Appl. No.: 747,054

[22] Filed: Jun. 20, 1985

[51] Int. Cl.$^4$ .................. B61B 13/12; B61L 3/04
[52] U.S. Cl. ................................. 104/166; 104/250
[58] Field of Search ............... 104/165, 250, 166; 74/89

[56] References Cited

U.S. PATENT DOCUMENTS

| | | | |
|---|---|---|---|
| 402,933 | 5/1889 | Judson | 104/166 |
| 3,356,040 | 12/1967 | Fonden | 104/130 |
| 3,621,790 | 11/1971 | Broome | 104/166 X |
| 3,818,837 | 6/1974 | Jacoby et al. | 104/166 |
| 3,842,752 | 10/1974 | Harwick | 104/166 |
| 3,861,322 | 1/1975 | Danly | 104/166 |
| 3,903,810 | 9/1975 | Jones | 104/166 |
| 4,036,148 | 7/1977 | Jones et al. | 104/166 |
| 4,203,511 | 5/1980 | Uhing | 104/166 X |
| 4,353,306 | 10/1982 | Rohrbach et al. | 104/166 |
| 4,355,580 | 10/1982 | Scheel | 104/166 |
| 4,367,683 | 1/1983 | Tokunaga | 104/166 |

OTHER PUBLICATIONS

Gutekunst et al application, Ser. No. 598,847, filed Apr. 10, 1984.

Primary Examiner—Robert B. Reeves
Assistant Examiner—Scott H. Werny
Attorney, Agent, or Firm—Wood, Dalton, Phillips, Mason & Rowe

[57] ABSTRACT

A linear drive unit having a carriage reciprocal along a path of travel and having a plurality of pairs of angularly adjustable drive wheels engaging opposite sides of a rotatable drive tube whereby rotation of the drive tube imparts linear motion to the carriage. The angle of the drive wheels is controlled by a remotely-operable air motor mounted directly on the carriage. A plurality of cams provide controlled acceleration and deceleration of the carriage adjacent the ends of its path of travel. A selectively operable inching control is remotely operable to provide for a reduced speed of travel of the linear drive unit. The linear drive unit is easily associated with the mass to be moved, such as a travelling hoist, and the forces generated by opposed drive wheels compressively engaging the drive tube are self-contained within the carriage. Additional control cams can be provided along the path of travel, if additional stopping locations are desired.

23 Claims, 6 Drawing Figures

LINEAR DRIVE UNIT

BACKGROUND OF THE INVENTION

This invention pertains to a linear drive unit having a power-driven, reciprocal carriage with controlled acceleration and deceleration adjacent the ends of its path of travel and with remotely controllable means to establish the direction of travel and also to vary the speed of operation to provide an inching control. The linear drive unit has particular utility for imparting movement to a member requiring controlled reciprocal movement, such as a hoist.

DESCRIPTION OF THE PRIOR ART

It is old to have a carriage or truck which is driven by a rotatable drive tube extending along the length of the path of travel of the carriage. The carriage has at least one drive wheel which can have a varied angular relation with the drive tube whereby rotation of the drive wheel by the drive tube results in linear movement of the carriage. The expired Fonden U.S. Pat. No. 3,356,040 discloses a conveyor system wherein a truck movable along tracks carries an angularly-adjustable drive wheel engageable with a rotatable drive tube.

Over the years, improvements and modifications have been made to provide for variable speed of travel of the carriage or truck by the coaction between a cam and a cam follower. The cam is positioned at a particular location along the path of carriage travel whereby engagement of the carriage-mounted cam follower therewith will cause a change in the angle of the drive wheel relative to the drive tube to resultingly cause a speed change. A structure for this purpose is shown in a pending application of Gutekunst et al, Ser. No. 598,847, filed Apr. 10, 1984, now U.S. Pat. No. 4,593,623, and which is owned by the assignee of this application. The carrier system disclosed in the Gutekunst et al application provides for controlled acceleration and deceleration of a carriage adjacent the ends of its path of travel and also has means for causing a change in the direction of travel of the carriage by changing the angle of the drive tube engaging drive wheels from a position at one side of a neutral nondriving position to a position at the other side thereof. This change is effected by a motor located at an end of the path of travel and, thus, the motor can only be operated to effect this result when the carriage is at an end of its path of travel. In the embodiment shown in FIGS. 12 and 13 of applicants' prior pending application, a pair of air cylinders 175 and 180 control the angle of the drive wheels associated with the rotatable drive tube and these air cylinders are described as being remotely controlled.

The systems known in the prior art have not embodied a linear drive unit reciprocal in a path of travel with controlled acceleration and deceleration at both ends of the path of travel and wherein the direction of travel is controlled by a remotely operated motor mounted on the carriage of the linear drive unit. Also, prior known systems have not had remotely-operable selective control means providing an inching control wherein the carriage can move at a speed which is a fraction of the normal rate of travel.

SUMMARY OF THE INVENTION

A primary feature of the invention is to provide a linear drive unit having a reciprocal carriage which derives its motion from a rotatable drive tube and which is capable of moving a large mass. More particularly, the linear drive unit has one or more pairs of spaced-apart drive wheels engaging opposite sides of the drive tube to enable the drive wheels to engage the drive tube with substantial force to minimize slippage between the drive tube and drive wheels when operating the carriage and with the aforesaid forces being self-contained within the carriage A hoist or other track-mounted conveying element may have reciprocal powered movement imparted thereto. Commonly, this is done by means of a motor and gear drive, with the motor being either electrical or hydraulic and being reversible to achieve the reciprocal capability. Drives of this type require adequate controls for accelerating and decelerating the mass that is being moved and require starting, stopping and reversing of the motor. This can result in an expensive drive and with hydraulics there can be leakage which is a particular problem when the leakage occurs above the object being moved by the hoist.

The linear drive unit embodying the invention takes advantage of a known drive system wherein the drive is taken from a rotatable drive tube which may be rotated at a constant speed in one direction of rotation by means of drive wheels mounted on a reciprocal carriage and with the drive wheels being adjustable. The drive wheels can be in positions at either side of a neutral, nondriving position wherein the wheels lie in a plane transverse to the length of the drive tube. The linear drive unit has the angle of the drive wheels relative to the drive tube controlled by an air motor mounted on the carriage whereby the position of the drive wheels to determine the direction of travel of the carriage may be remotely controlled. A source of compressed air for the motor is normally available in a factory and there is no need to provide a hydraulic power source.

The linear drive unit of the invention additionally has structure providing for controlled acceleration and deceleration of the carriage at both ends of the reciprocal path of travel by uniformly changing the angles of at least one pair of opposed drive wheels and also selectively operable inching control means which are operable from a remote location to provide a speed of travel for the carriage which is a fraction of the normal travel speed.

An object of the invention is to provide a linear drive unit as described in the preceding paragraphs which provides for powered movement of a hoist or other conveying device and which has structure which is more economical and reliable than prior systems and which avoids the needs for controls which affect the cost and reliability of previously known systems.

Still another object of the invention is to provide a linear drive unit having one or more pairs of drive wheels movably mounted on a reciprocal carriage and which are arranged to have the drive wheels of each pair engage opposite sides of a drive tube to have all of the compressive forces between the drive wheels and drive tube self-contained in the carriage of the linear drive unit whereby substantial amounts of torque may be transmitted from the drive tube to the carriage through the drive wheels for causing reciprocal movement of a large mass connected to or supported by the carriage.

Another object of the invention is to provide a linear drive unit having an elongate rotatable drive member, a carriage movable lengthwise of said drive member, a drive wheel on said carriage engageable with said drive member arranged whereby rotation imparted to the drive wheel by the drive member may impart linear movement to the carriage, means mounting said drive wheel for movement to positions either side of a neutral position wherein said drive wheel lies in a plane normal to the length of the drive member, and a remotely operable motor on said carriage for moving said drive wheel to any one of said positions.

An additional object of the invention is to provide a linear drive unit having an elongate rotatable drive tube, a reciprocable carriage movable in a path of travel lengthwise of said drive tube, a plurality of pairs of spaced-apart opposed drive wheels with the drive wheels of a pair having the drive tube therebetween and in driving engagement therewith, means mounting the drive wheels for canting relative to the drive tube to various angles at either side of a position lying in a plane transverse to the drive tube with the drive wheels of each pair having equal and opposite inclination, and means for controlling said inclination of said drive wheels to control the direction of travel of said carriage.

Still another object of the invention is to provide a linear drive unit comprising, a reciprocable carriage, an elongate rotatable drive tube having a length approximately equal to the desired path of travel of the carriage, at least one drive wheel on the carriage and engageable with the drive tube, a pivotal mounting for said drive wheel enabling movement of the drive wheel to positions either side of a neutral nondriving position, a pair of cams adjacent each end of the carriage path of travel for controlling deceleration in one direction of carriage movement and acceleration in the opposite direction of carriage movement adjacent one end of the path of carriage travel, a pair of cam followers associated with the drive wheel pivotal mounting for coaction with said cams, a motor on said carriage, means connecting said motor to the drive wheel pivotal mounting to yieldably urge a cam follower against a cam, means for limiting movement of said cam follower when the cam follower is not on a cam to limit the movement of the drive wheel pivotal mounting, and selectively operable means for further limiting the movement of the drive wheel pivotal mounting to provide an inching speed for the carriage.

DESCRIPTION OF THE PREFERRED EMBODIMENT

Figure 1:
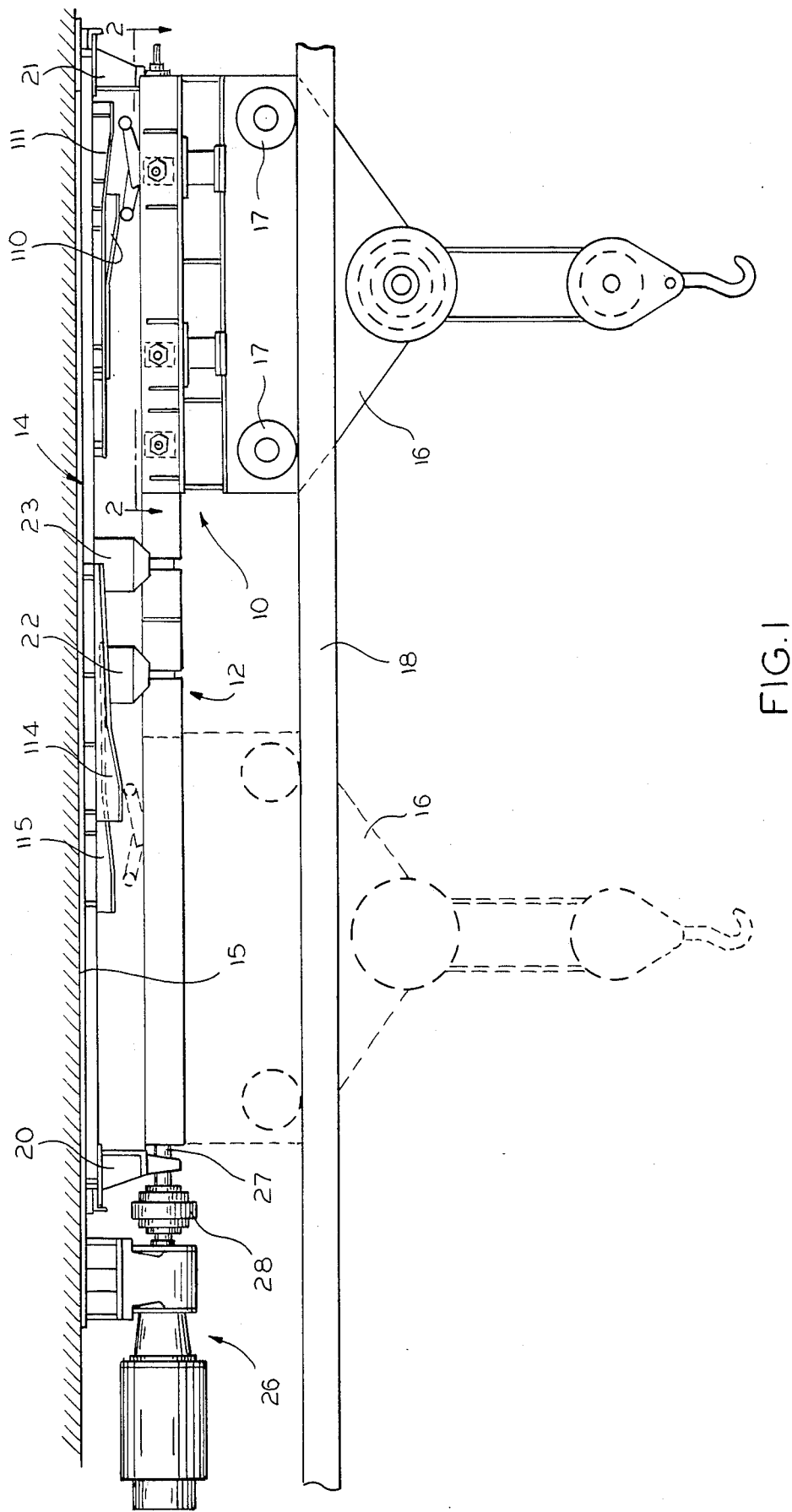
FIG. 1 is a side elevational view of the linear drive unit shown in association with a hoist and in two different positions.

The linear drive unit is shown generally in FIG. 1 and comprises a carriage, generally indicated at 10, which is reciprocal in a path of travel and which extends along the length of a rotatable drive tube, indicated generally at 12. Portions of the linear drive unit are supported from a plate structure, indicated generally at 14, which is secured to an overhead support 15. The carriage 10 is shown in association with a travelling hoist having a trolley 16 with wheels 17 at opposite sides thereof which roll along a pair of support tracks, one of which is shown at 18, whereby the carriage 10 can travel with the hoist between positions shown in full line and broken line in FIG. 1. Although the linear drive unit is shown in association with a hoist, it will be evident that it has utility as a transport or drive mechanism for any movable member which requires a reciprocal path of travel.

The carriage path of travel can be of a substantial length, with the length of the path being determined by the length of the rotatable drive tube 12. A relatively short length of drive tube is shown in FIG. 1 and it will be evident that additional lengths of drive tube can be added centrally of the length shown in FIG. 1 to increase the over-all length.

The drive tube 12 is seen in all of the Figures of the drawings and consists of end-to-end tubular members interconnected at adjacent ends for rigidly transmitting a drive therebetween and which is rotatably supported by depending bearings. These bearings include a pair of end bearings 20 and 21 and central bearings 22 and 23. The rotatable drive tube 12 is driven at a uniform rotational speed by means of a motor and gearbox 26 which connects to a shaft 27 extending from an end of the drive tube by means of a coupler 28.

The carriage 10 of the linear drive unit is caused to move lengthwise of the drive tube 12 by means which converts rotation of the drive tube to linear movement of the carriage. This means comprises a drive wheel movably mounted on the carriage engageable with the drive tube 12 and positionable in various angular positions whereby rotation of the drive wheel by engagement with the drive tube results in linear movement of the carriage.

More particularly, the carriage has a plurality of pairs of drive wheels, with the drive wheels of a pair engaging opposite sides of the drive tube 12. A primary pair of drive wheels 30 and 31 are seen in FIGS. 2-6, with the opposed relation relative to the drive tube 12 being seen particularly in FIG. 4. The linear drive unit also has secondary pairs of drive wheels to the left of the primary pair of drive wheels 30 and 31, as viewed in FIGS. 2 and 3. One of these secondary pairs is identified at 32 and 33. The carriage 10 has a frame, with a pair of longitudinally-extending side plates 34 and 35 which pivotally mount a drive wheel mounting 30a–33a for the respective drive wheels 30-33. Each of the drive wheel mountings is of a similar construction and includes a mounting base 38 pivotally connected to a side member of the carriage frame, as by a bolt 36 pivotally mounting the drive wheel mounting 30a to the side member 34. As known in the art, each of the drive wheel mountings includes strong springs which yieldably urge the drive wheel toward the drive tube 12.

With the opposed pairs of drive wheels, the drive wheels can engage the drive tube with considerable pressure to avoid slipping of the drive wheels relative to the drive tube with resultant transmission of substantial torque to the carriage. This results in self-contained forces in the carriage and the pressures of the drive wheels against the drive tube need not be reacted against structure externally of the carriage. It will be evident that the number of pairs of drive wheels used in a particular application may readily be varied by the length of the frame of the carriage and the number of pairs selected is dependent upon the mass to be transported by the linear drive unit.

Figure 2:
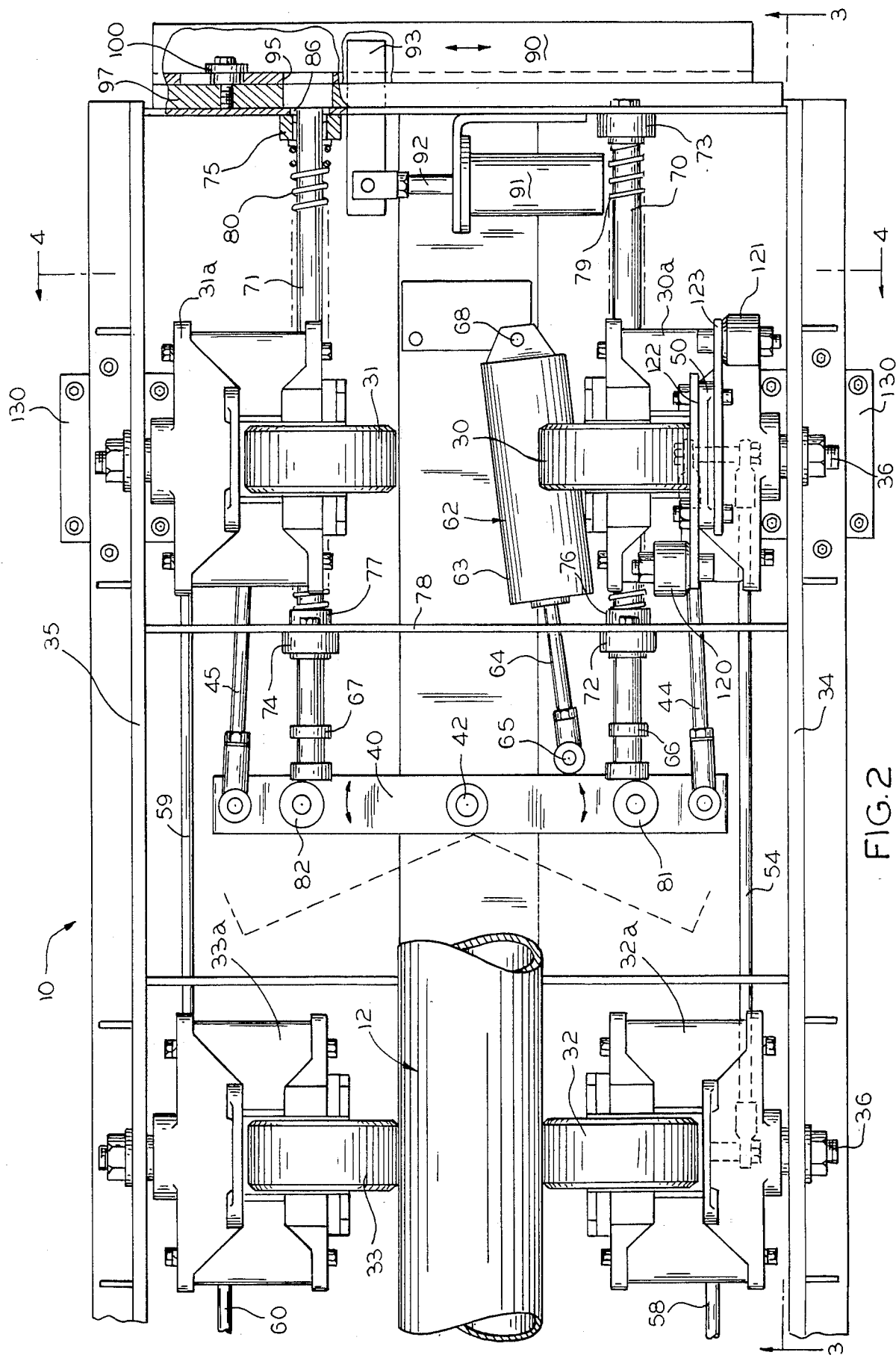
FIG. 2 is a fragmentary plan view, on an enlarged scale, taken generally along the line 2—2 in FIG. 1.
Figure 5:
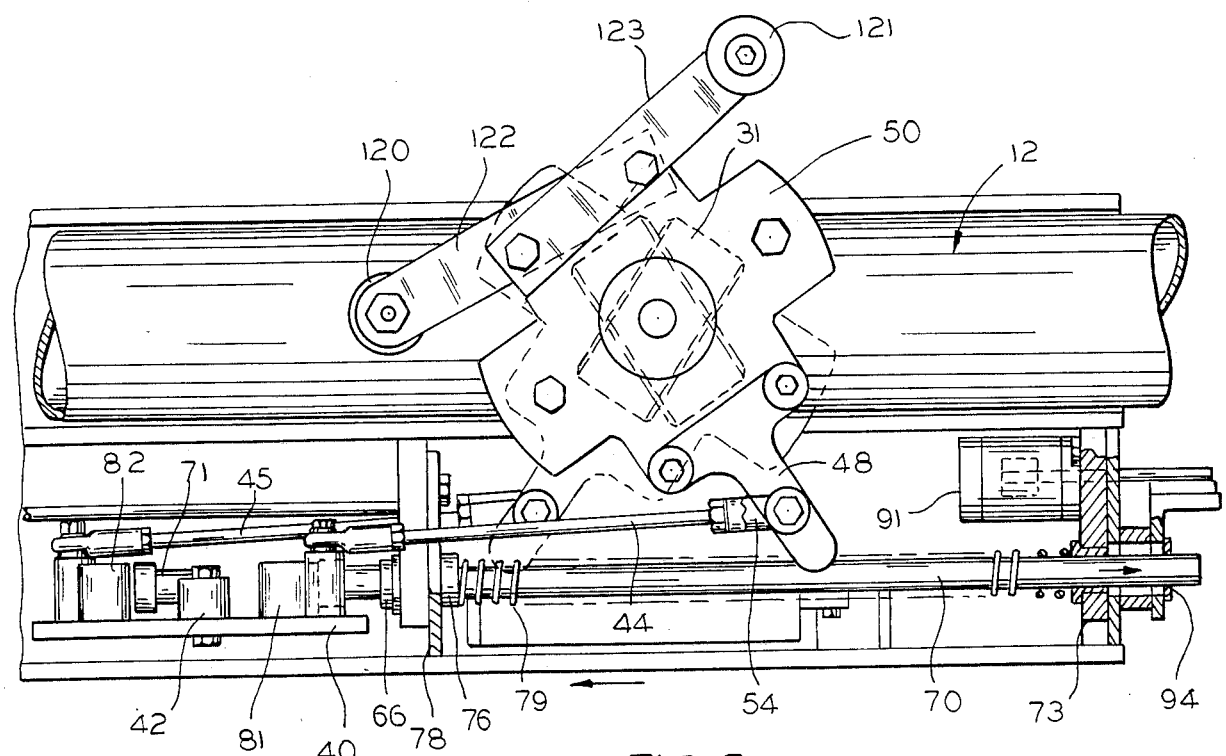
FIG. 5 is a fragmentary view of a portion of the structure shown in FIG. 3 in a different operative position with parts broken away.
Figure 6:
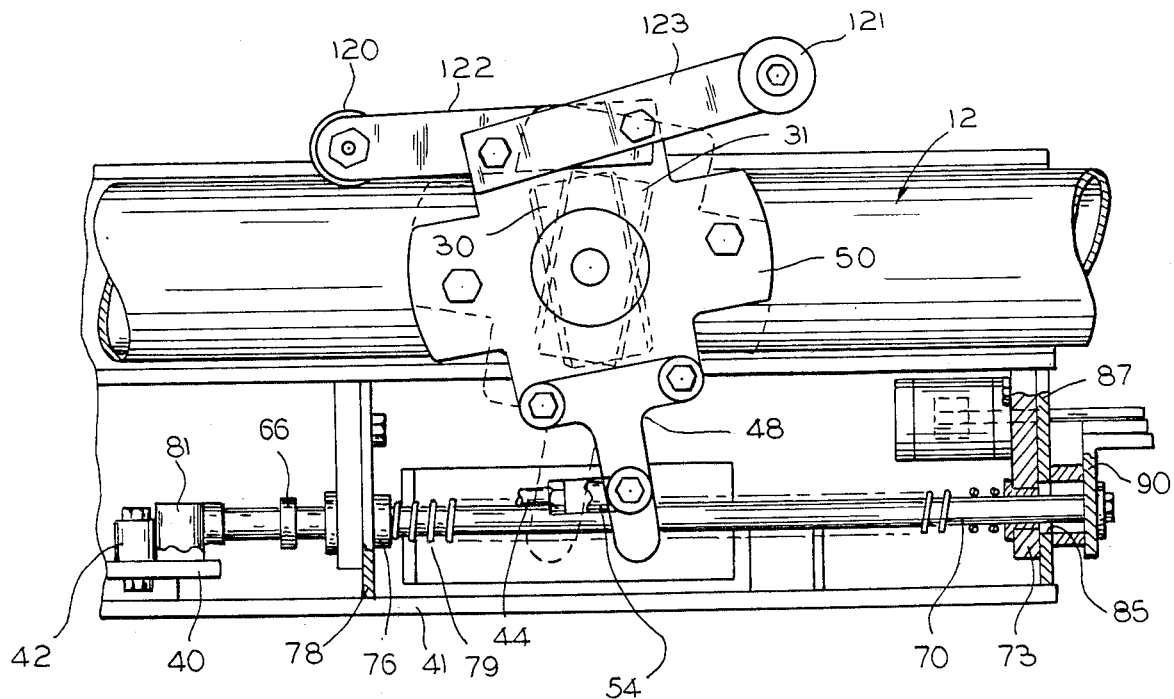
FIG. 6 is a view similar to FIG. 5 showing the mechanism in a different operative position.

Each of the drive wheels 30–33 operates in a manner known in the art and is movable between the neutral, nondriving positions thereof shown in FIG. 2 wherein the drive wheels lie in a plane transverse to the length of the drive tube, to operative positions at either side of the neutral position. Referring to the primary drive wheels 30 and 31, as seen in FIGS. 5 and 6, the drive wheels have two positions, both at one side of the neutral position. A maximum rate of travel speed for the carriage 10 is achieved, with the drive wheels at a maximum angle relative to the neutral position and with this position shown in FIG. 5. A lesser speed of carriage travel is achieved when the drive wheels are at a lesser angle relative to the neutral position and one of these positions is shown in FIG. 6.

The linear drive unit has several different means for controlling the angle of the drive wheels, including angles of the drive wheels which are at positions at the opposite side of neutral from the positions shown in FIGS. 5 and 6. All of the drive wheels of the secondary pairs which are on the same side of the drive tube as the drive wheel 30, as for example, the drive wheel 32, are caused to assume the same angle as the drive wheel 30 and correspondingly the drive wheels of the secondary pairs at the same side of the drive tube as the drive wheel 31 are caused to assume the same angle as the drive wheel 31.

The similarity of the angles of the drive wheels is achieved by drive wheel-positioning means including a pivoted member 40 positioned above a base plate 41 of the carriage frame and mounted by a pivot pin 42 for pivotal movement about a pivot axis located at the center of the pivoted member. A pair of control links 44 and 45 are pivotally connected to opposite ends of the pivoted member 40 and extend to pivot connections at 46 and 47 (FIG. 4) which pivotally connect the control links to the respective plates 48 and 49 which are secured to mounting plates 50 and 51 forming part of the drive wheel mountings 30a and 31a. With pivoting movement of the pivoted member 40 about the pivot axis thereof, there is resulting equal and opposite angular movement of the drive wheels 30 and 31 as is evident in FIGS. 5 and 6.

The motion imparted to the drive wheel 30 of the primary pair is also imparted to drive wheels 32 of the secondary pairs which are on the same side of the drive tube 12 by a first set of links, including a link pivotally connected at one of its ends to the plate 48 and pivotally connected to a member 55 similar to the plate 48 and which is connected to a plate 56 of the mounting for the drive wheel 32. A pivotal connection at 57 provides for a link 58 which can extend on to the next drive wheel. Similarly, a set of links associated with the primary drive wheel 31 imparts equal angular movement to the drive wheels of the secondary pairs on the same side of the drive tube 12 with a link 59, similar to the link 54, extending to the mounting 33a for the drive wheel 33 and a link 60 extending therefrom to another drive wheel mounting on the same side of the drive tube.

The means for establishing the drive of the carriage 10 by setting the angles of the drive wheel mountings additionally includes a motor and, more particularly, a double-acting air motor 62. As seen in FIG. 2, the motor 62 has a cylinder 63 from which a motor rod 64 extends and which is pivotally connected to the pivoted member 40 at a pivot 65. Extension of the rod causes movement of the pivoted member in one direction, while retraction thereof causes movement of the pivoted member in the opposite direction. The limits of pivoting of the pivoted member 40 are controlled by a pair of adjustable locking collars 66 and 67 to be described. With the locking collars 66 and 67, the stroke of the air motor need not be precisely controlled. The motor cylinder 63 is pivotally mounted to the carriage frame at 68 to accommodate the pivoting movement of the pivoted member 40. The motor can be operated from a remote location, with the only requirement that there be a pair of air lines connected to opposite ends of the motor cylinder 63 whereby the pivoted member can be urged in either of two rotative directions, dependent upon the application of air to the motor cylinder.

Figure 3:
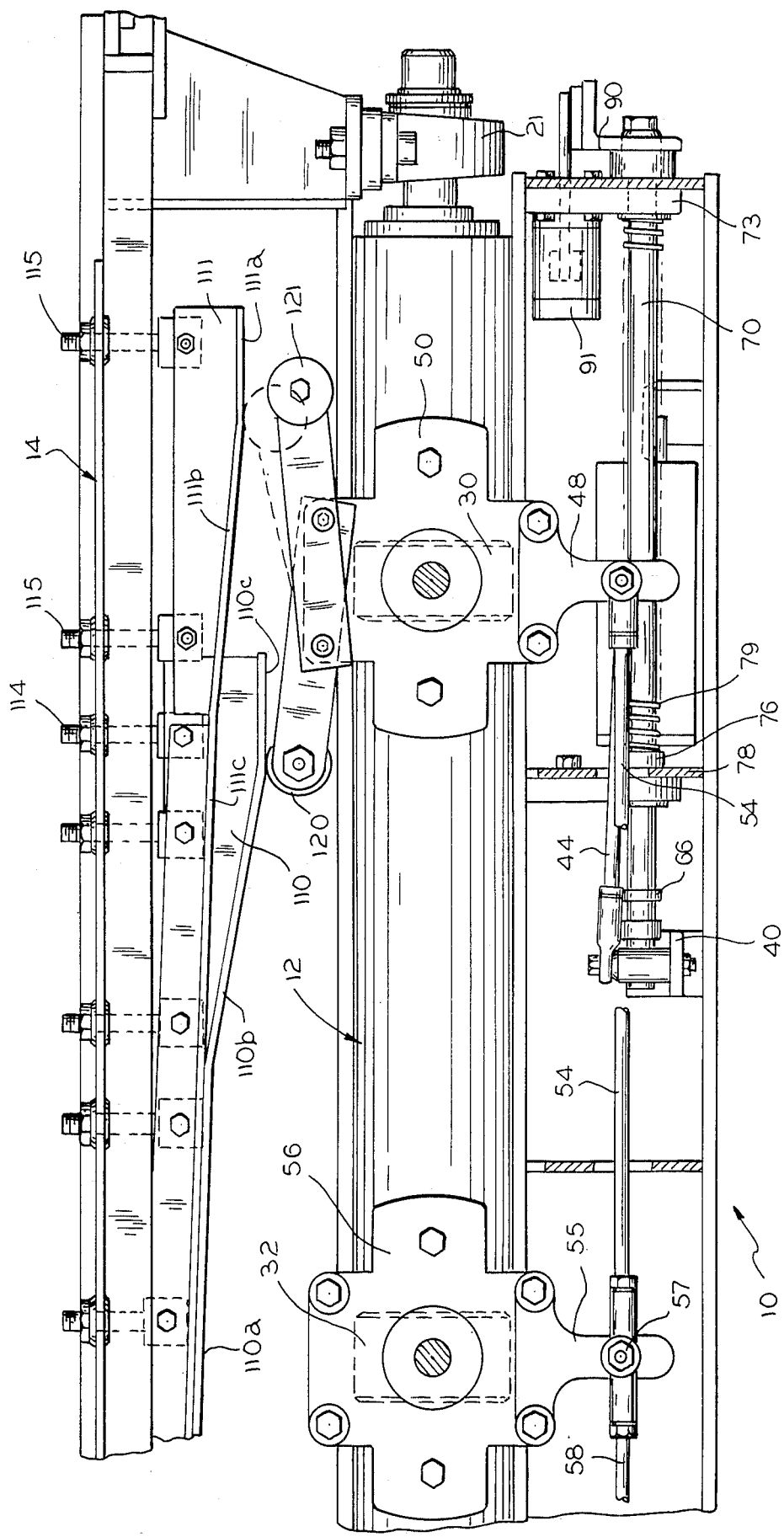
FIG. 3 is a vertical section, taken generally along the line 3—3 in FIG. 2.

Absent any positive force establishing the angle of the drive wheels, the drive wheels are caused to be in the neutral nondriving position shown in FIGS. 2 and 3. This is the position of the pivoted member shown in FIG. 2 and the pivoted member 40 is urged to this position by a pair of longitudinally movable control rods 70 and 71 movably mounted on the carriage frame by spaced bearings 72 and 73 for the control rod 70 and spaced bearings 74 and 75 for the control rod 71. The control rods each have an adjustable collar 76 and 77, respectively, fitted thereon and urged into abutting relation with a frame plate 78 by respective compression springs 79 and 80 extending between the adjustable members 76 and 77 and the bearings 73 and 75 fixed to the frame. The springs associated with the control rods are effective to urge the control rods to the position shown in FIG. 2, with the ends of the respective control rods 70 and 71 coacting with the respective bumper rollers 81 and 82 on the pivoted member 40. The springs act against the force of the motor 62 and assure a neutral position if there should be either loss of air or electrical failure. If the pivoted member 40 is at an angle relative to the position shown in FIG. 2, and all restraining forces are removed from the pivoted member, the control rods will function to return the pivoted member to the position shown to place the drive wheels in a neutral nondriving position. The adjustable collars 76 and 77 prevent the control rods moving to the left from the position shown in FIG. 2.

The aforementioned locking collars 66 and 67 are adjustably mounted on control rods 70 and 71, respectively. Actuation of the motor 62 moves the drive wheels to a maximum drive angle, as shown in FIG. 5, with one or the other of the locking collars 66 and 67 abutting one of bearings 72 or 74 to limit pivoting of the pivoted member 40. When it is desired to operate the linear drive unit at a slower carriage speed, inching control means can be operated which includes the control rods 70 and 71. The inching control means provides a reduced speed which has particular utility in setting-up equipment along the path of hoist travel and which must have movements coordinated with hoist movement.

As seen in FIGS. 2, 3, 5 and 6, the control rods 70 and 71 may move through openings 85 and 86, respectively, in a frame end plate 87 and, when the drive wheels are at maximum drive angle, one of the control rods extends a major distance therebeyond, as seen for the control rod 70 in FIG. 5. When a lesser drive speed is desired, one or the other of the control rods is blocked to prevent full extension thereof to the position shown in FIG. 5 and with the blocked position being shown in FIG. 6. The degree of movement of the control rods is controlled by a laterally shiftable plate 90 which extends transversely of the carriage 10. The plate 90 is shiftable between an inoperative position, shown in FIGS. 2 and 5, and an operative position, shown in FIG. 6, by means of an air motor 91 controlled by a solenoid-operated valve which positions a rod 92 which is connected to the plate 90 by a connecting member 93. A vertical flange of the plate 90 is provided with a pair of openings of a size to receive the control rods, with the openings being seen at 94 and 95.

When the inching control is inoperative, the openings 94 and 95 are aligned with the control rods 70 and 71 to permit extension of at least one control rod end therethrough. When the inching control is to be effective, the air motor 91 is operated and the plate 90 is shifted laterally to shift the openings 94 and 95 out of alignment with the control rods whereby movement of a control rod is limited as seen in FIG. 6. The inching control speed can be varied by determining the distance of the plate 90 from the frame end plate 87. This can be varied, dependent upon the thickness of a spacer plate 97 disposed therebetween and having openings aligned with the openings 85 and 86 in the frame end plate 87. The spacer plate 97 mounts a pair of members 100 with enlarged heads, one of which is shown in FIG. 2, and which coact with slots in the vertical flange of the plate 90 to movably guide the plate 90 relative to the carriage 10.

The linear drive unit has a reciprocal path of travel along the drive tube 12, with a change in direction of travel achieved by remote control of the air motor 62.

Additionally, the linear drive unit has means for controlling acceleration and deceleration of the carriage 10 adjacent each end of its path of travel. Referring to FIG. 1, there are respective deceleration and acceleration cams 110 and 111 adjacent one end of the drive tube 12 and one end of the path of carriage travel and respective deceleration and acceleration cams 114 and 115 adjacent the other end of the path of travel. The deceleration and acceleration cams 110 and 111 are shown particularly in FIG. 4 and the location lengthwise of the path of travel can be adjusted, dependent upon the mounting of threaded attaching members for the cams to series of longitudinally-spaced openings in the plate structure 14. The mounting members are shown at 114 and 115 and extend upwardly from the cams through openings in the plate structure 14 and have nuts 116 threaded thereon. Additional attaching members are located along the length of the cams. The cams coact with a pair of cam followers 120 and 121 supported from the wheel mounting plate 50 in laterally spaced relation on a pair of arms 122 and 123 fixed to the mounting plate 50.

Referring particularly to FIG. 3, the deceleration cam 110 has a lead-in section 110a with a gradual downward slope followed by a section 110b of increased slope and a generally horizontal section 110c. When the carriage 10 of the linear drive unit is moving from left to right, the rod 64 of the motor 62 has been extended to pivot the pivoted member 40 in a clockwise direction, as seen in FIG. 2. The pull on the link 44 has caused pivoting of the drive wheel mounting 30a to a position wherein the cam follower 120 is positioned a substantial distance above the drive tube 12. As the carriage approaches the end of its path of travel, the cam follower 120 enters onto the deceleration cam 110 and moves progressively along the sections thereof until the primary drive wheel 30 is substantially in neutral, nondriving position. Through the pivoted member 40, the primary drive wheel 31 is caused to also move to a lesser angle and, through the first and second sets of connecting links, the other drive wheels at opposite sides of the drive tube are caused to move to correspondingly reduced angles. The deceleration cam moves the drive wheels toward the neutral position against the force of the motor 62. The drive wheels will remain at a small angle to exert a constant small force urging the carriage to the right, as viewed in FIG. 3.

Reversal of actuation of the motor 62 retracts the motor rod 64 to pivot the pivoted member 40 in a counterclockwise direction, whereby the primary drive wheels are caused to move to the opposite side of a neutral, nondriving position, and the acceleration cam 111 becomes effective to prevent upward movement of the cam follower 121 to the position shown in FIG. 5 and limit it to the broken line position shown in FIG. 3. This is adequate movement to start the drive of the carriage toward the left, as viewed in FIG. 3, and, as the cam follower 121 leaves the generally horizontal section 111a and travels along the inclined sections 111b and 111c, the angle of the drive wheels increases. Once the cam follower leaves the acceleration cam 111, the drive wheel angle remains the same, since the locking collar 66 is against the bearing 72.

As the carriage approaches the deceleration cam 114, constructed similarly to the deceleration cam 110, the cam follower 121 coacts therewith to gradually bring down the linear speed of the carriage and, upon reverse actuation of the motor 62, the cam follower 120 is brought into coaction with the acceleration cam 115 to repeat the acceleration of the carriage in moving toward the right as viewed in FIG. 1 and in the same manner as previously described in connection with the acceleration cam 111.

Figure 4:
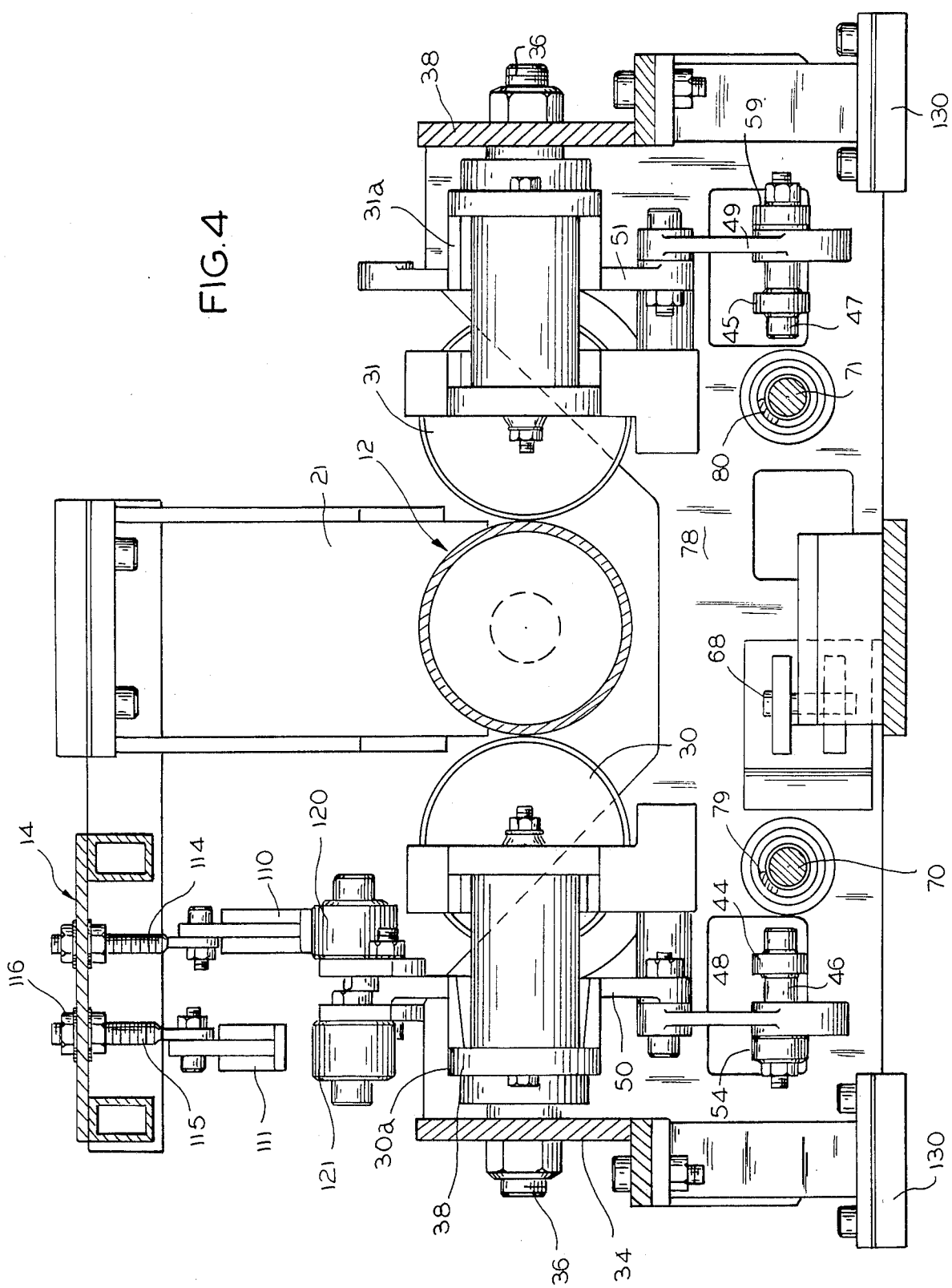
FIG. 4 is a transverse section, on a further enlarged scale, taken generally along the line 4—4 in FIG. 2.

The carriage 10 of the linear drive unit in the form shown in the drawings takes its support from the trolley 16 of the travelling hoist and is suitably attached thereto at a plurality of mounting pads 130 positioned at spaced locations on the carriage frame and two of which are shown in FIGS. 2 and 4.

The linear drive unit disclosed herein provides a power source for transport of substantial mass with reciprocal motion imparted thereto and with the forces involved in generating this power being self-contained within the linear drive unit. The linear drive unit provides for reversal of travel by reversing the angle of the drive wheels associated with the drive tube and with the drive wheels arranged in opposed pairs at opposite sides of the drive tube for positive pressure engagement with the drive tube to facilitate transport of large masses. The reversal of travel is achieved by a remotely controlled motor mounted on the carriage of the linear drive unit and with there being controlled acceleration and deceleration as well as remotely selectively operable inching control means to provide for a selective reduction in speed of travel.

We claim:

1. A bi-directional linear drive unit having an elongate rotatable drive tube, a carriage movable lengthwise of said tube, a plurality of drive wheels on said carriage engageable with said drive tube arranged whereby rotation imparted to the drive wheels by the drive tube may impart linear movement to the carriage, means mounted said drive wheels for movement to positions either side of a neutral position wherein said drive wheels lie in a plane normal to the length of the drive tube, remotely-operable means including an air-operated motor on said carriage for moving said drive wheels to any one of said positions, yieldable means for urging said drive wheels from a position either side of the neutral position to said neutral position, and cam means operable to move said drive wheels from one of said positions toward said neutral position against the force of said motor.

2. A linear drive unit as defined in claim 1 wherein said drive wheels are a pair of opposed drive wheels engaging the drive tube oppositely of each other.

3. A linear drive unit as defined in claim 1 wherein said motor has a member yieldably movable to a position to cause said drive wheels to move to a position imparting maximum speed to the carriage, and inching control means selectively operable to limit movement of the drive wheels to a position short of the last-mentioned position when said motor is operated.

4. A linear drive unit as defined in claim 1 including links means interconnecting said drive wheels for simultaneous movement and including a pivotable member, said motor being air-operated and having a movable member connected to said pivotable member, settable means for limiting the movement of the pivotable member to establish a maximum drive position of the drive wheels, and selectively operable means for limiting the pivotal movement of said pivotable member to a position less than the maximum drive position to establish an inching position for said drive wheels.

5. A linear drive unit as defined in claim 4 wherein said selectively operable means comprises a spring-loaded movable rod engaging said pivotable member, a movable plate movable transversely to the path of movement of the movable rod and positionable to obstruct the movement of the movable rod, and remotely-operable means for moving said plate.

6. A linear drive unit as defined in claim 5 wherein said yieldable means urging said drive wheels to said neutral position include a pair of said spring-loaded movable rods engaging the pivotable member at opposite sides of the pivot.

7. A linear drive unit having an elongate rotatable drive tube and a reciprocable carriage movable in a path of travel lengthwise of said drive tube, said carriage comprising a plurality of pairs of spaced-apart opposed drive wheels with the drive wheels of a pair having the drive tube therebetween and in compressive driving engagement therewith, means pivotally mounting the drive wheels about pivot axes for canting relative to the drive tube to various angles at either side of a position lying in a plane transverse to the drive tube with the drive wheels of each pair having equal and opposite inclination, the opposed drive wheels of a pair having their pivot axes in a line which intersects the rotational axis of the elongated rotatable drive tube to avoid any deflection loading on the elongate drive tube, and means for controlling said canting of said drive wheels to control the direction of travel of said carriage including an air-operated motor, and cam means operable to move said drive wheels toward said plane against the force of said motor.

8. A linear drive unit as defined in claim 7 wherein said cam means are adjacent opposite ends of the drive tube for progressively reducing said angles of the drive wheels as the carriage approaches one end of its path of travel.

9. A linear drive unit as defined in claim 8 wherein said cam means includes a pair of cams in fixed positions, one adjacent each end of the drive tube, and a pair of cam followers operatively connected to said drive wheels and positioned for selective engagement, one with each of said cams.

10. A linear drive unit as defined in claim 7 including means adjacent opposite ends of the drive tube enabling progressive increase of said angles of the ddrive wheels as the carriage departs from one end of its path of travel.

11. A linear drive unit having a rotatable drive tube, a carriage movable along the length of said drive tube, said carriage having opposed pairs of drive wheels engageable with opposite sides of said drive tube at locations which lie on a straight line extended through the rotational axis of the drive tube, a pivotal mounting for each drive wheel, drive wheel positioning means including a pivotable member pivotal about a pivot axis, a first set of links interconnecting said pivotable member at one side of the pivot axis with the pivotal mountings for the drive wheels at one side of the drive tube, a second set of links interconnecting said pivotable member at the other side of the pivot axis with the pivotal mountings for the drive wheels at the other side of the drive tube, and means for moving said pivotable member to cause equal and opposite movement of the drive wheel pivotal mountings for the drive wheels at opposite sides of the drive tube including an air-operated motor, and cam means operable to move the drive wheel pivotal mountings against the force of the motor.

12. A linear drive unit as defined in claim 11 including a pair of cams for controlling acceleration and deceleration of the carriage, a mounting plate mounted to the pivotal mounting for one of the drive wheels, and a pair of cam followers on said mounting plate one associated with each of said cams and movable thereby to control the position of the pivotal mountings of all the drive wheels through movement of said pivotable member and said two sets of links.

13. A linear drive unit as defined in claim 12 wherein said motor is on the carriage and operatively connected to said pivotable member, and yieldable means for urging said drive wheels to a neutral non-drive transmitting position against the force of said motor.

14. A linear drive unit as defined in claim 13 wherein said motor has a movable member yieldable movable to a position to position said pivotable member to cause said drive wheels to move to a position imparting maximum speed to the carriage, and inching control means selectively operable to prevent movement of the drive wheels to the last-mentioned position when said motor is operated.

15. A linear drive unit as defined in claim 14 wherein said inching control means includes said yieldable means and comprises a spring-loaded movable rod engaging said pivotable member, a movable plate on the carriage positionable to obstruct the movement of the movable rod, and remotely-operable means on the carriage for moving said plate.

16. A linear drive unit as defined in claim 15 wherein there are a pair of said spring-loaded movable rods engaging the pivotable member at opposite sides of the pivot.

17. A linear drive unit comprising, a reciprocable carriage, an elongate rotatable drive tube having a length approximately equal to the desired path of travel of the carriage, at least one drive wheel on the carriage and engageable with the drive tube, a pivotal mounting for said drive wheel enabling movement of the drive wheel to positions either side of a neutral nondriving position, a pair of cams adjacent each end of the carriage path of travel for controlling deceleration in oen direction of carriage movement and acceleration in the opposite direction of carriage movement when the carriage is near an end of its path of travel, a pair of cam followers associated with the drive wheel pivotal mounting for coaction with said cams, a motor on said carriage, means connecting said motor to the drive wheel pivotal mounting to yieldably urge a cam follower against a cam, means for limiting movement of said cam follower when the cam follower is not on a cam to limit the movement of the drive wheel pivotal mounting, and selectively operable means for further limiting the movement of the drive wheel pivotal mounting to provide an inching speed for the carriage.

18. A linear drive unit as defined in claim 17 wherein said drive wheels are a pair of opposed drive wheels engaging the drive tube oppositely of each other.

19. A linear drive unit as defined in claim 18 including link means interconnecting the pivotal mountings for said pair of drive wheels for simultaneous movement and including a pivotable member, said motor being air-operated and having a movable member connected to said pivotable member.

20. A linear drive unit as defined in claim 19 wherein said selectively operable means comprises a spring-loaded movable rod engaging said pivotable member, a movable plate positionable to obstruct the movement of the movable rod, and remotely-operable means for moving said plate.

21. A linear drive unit as defined in claim 20 wherein there are a pair of said spring-loaded movable rods engaging the pivotable member at opposite sides of the pivot, and said plate is movable to a position to obstruct the movement of both of said rods.

22. A linear drive unit comprising, a reciprocable carriage, an elongate rotatable drive tube having a length approximately equal to the desired path of travel of the carriage, plural spacedapart pairs of drive wheels on the carriage, the drive wheels of a pair engageable with opposite sides of the drive tube, a pivotal mounting for each drive wheel enabling movement of the drive wheel to positions either side of a neutral nondriving position, a pair of cams adjacent each end of the carriage path of travel for controlling deceleration in one direction of carriage movement and acceleration in the opposite direction of carriage movement when the carriage is near an end of its path of travel, a pair of cam followers associated with the pivotal mounting for one of the drive wheels for coaction with said cams, means connecting the pivotal mountings for the other drive wheels with said one pivotal mounting for simultaneous movement therewith, an air-operated motor on said carriage, means connecting said motor to said one drive wheel pivotal mounting to urge a cam follower toward a cam, means for limiting movement of said cam follower when the cam follower is not on a cam to limit the movement of said one drive wheel pivotal mounting, and selectively operable means for further limiting the movement of said one drive wheel pivotal mounting to provide an inching speed for the carriage.

23. A linear drive unit having an elongate rotatable drive tube, a carriage movable lengthwise of said tube, a plurality of drive wheels on said carriage engageable with said drive tube arranged whereby rotation imparted to the drive wheels by the drive tube may impart linear movement to the carriage, means mounting said drive wheels for movement to positions either side of a neutral position wherein said drive wheels lie in a plane normal to the length of the drive tube, remotely-operable means including a motor on said carriage for moving said drive wheels to any one of said positions, link means interconnecting said drive wheels for simultaneous movement and including a pivotable member, said motor having a movable member connected to said pivotable member, and selectively operable means for limiting the pivotal movement of said pivotable member to establish an inching position for said drive wheels, comprising a spring-loaded movable rod engaging said pivotable member, a movable plate movable transversely to the path of movement of the movable rod and positionable to obstruct the movement of the movable rod, and remotely-operable means for moving said plate.

* * * * *